(12) United States Patent
Lei et al.

(10) Patent No.: US 9,016,745 B2
(45) Date of Patent: Apr. 28, 2015

(54) PICK UP MECHANISM

(71) Applicants: Fu Tai Hua Industry (Shenzhen) Co., Ltd., Shenzhen (CN); Hon Hai Precision Industry Co., Ltd., New Taipei (TW)

(72) Inventors: Cheng-Huan Lei, Shenzhen (CN); Yong-Feng Wang, Shenzhen (CN); Yun Zhao, Shenzhen (CN); Zhi-Tang Dai, Shenzhen (CN); Dong Li, Shenzhen (CN); Sha Shen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/105,394

(22) Filed: Dec. 13, 2013

(65) Prior Publication Data
US 2014/0175818 A1    Jun. 26, 2014

(30) Foreign Application Priority Data
Dec. 24, 2012  (CN) .......................... 2012 1 0563732

(51) Int. Cl.
*B25J 15/06*    (2006.01)

(52) U.S. Cl.
CPC .................................. *B25J 15/0616* (2013.01)

(58) Field of Classification Search
CPC ...... B25J 15/0616; B66C 1/02; B66C 1/0237; B66C 1/0293
USPC .............. 294/183, 185; 901/40; 414/627, 737
See application file for complete search history.

(56) References Cited

U.S. PATENT DOCUMENTS

| 4,815,779 | A  | * | 3/1989 | Glessner et al. | 414/752.1 |
| 5,724,723 | A  | * | 3/1998 | Saliba et al. | 29/754 |
| 5,904,387 | A  | * | 5/1999 | Nagai et al. | 294/189 |
| 6,431,624 | B1 | * | 8/2002 | Dunger | 294/186 |
| 6,502,876 | B1 | * | 1/2003 | Stockhorst et al. | 294/183 |
| 7,222,901 | B2 | * | 5/2007 | Gebauer et al. | 294/183 |
| 8,113,560 | B2 | * | 2/2012 | Sone | 294/183 |
| 2008/0089768 | A1 | * | 4/2008 | Sakamoto et al. | 414/627 |
| 2010/0230984 | A1 | * | 9/2010 | Maffeis | 294/64.1 |
| 2013/0129464 | A1 | * | 5/2013 | Regan et al. | 414/800 |

\* cited by examiner

*Primary Examiner* — Saul Rodriguez
*Assistant Examiner* — Gabriela Puig
(74) *Attorney, Agent, or Firm* — Novak Druce Connolly Bove + Quigg LLP

(57) ABSTRACT

A pick up mechanism includes a pick up rod, a pick up head, and a resisting assembly. The pick up head is assembled to an end of the pick up rod. The resisting assembly includes a guiding seat, a resisting member, a pair of guiding rods, and a pair of elastic members. The guiding seat is fixedly sleeved on the pick up rod, the resisting member slidably shields the pick up head. The pair of guiding rods is fixed on the guiding seat, and blocks the resisting member. The pair of elastic members is resisted between the guiding seat and the resisting member, wherein the pick up head is exposed or shielded by moving the resisting member relative to the pick up rod.

16 Claims, 4 Drawing Sheets

PICK UP MECHANISM

BACKGROUND

1. Technical Field

The present disclosure relates to pick up mechanisms, and more particularly, to a pick up mechanism for picking up workpieces arranged in a large density.

2. Description of Related Art

A pick up mechanism may be used to pick up workpieces, such as nuts in a container. The pick up mechanism picks up one nut and aligns the nut to a receiving hole of a housing, and releases the nut into the receiving hole. Then the pick up mechanism moves back to the container to pick up another nut. When the nuts are arranged in a relative larger density in the container, due to the inference of nuts between each other, the pick up mechanism may not pick up the nut correctly.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
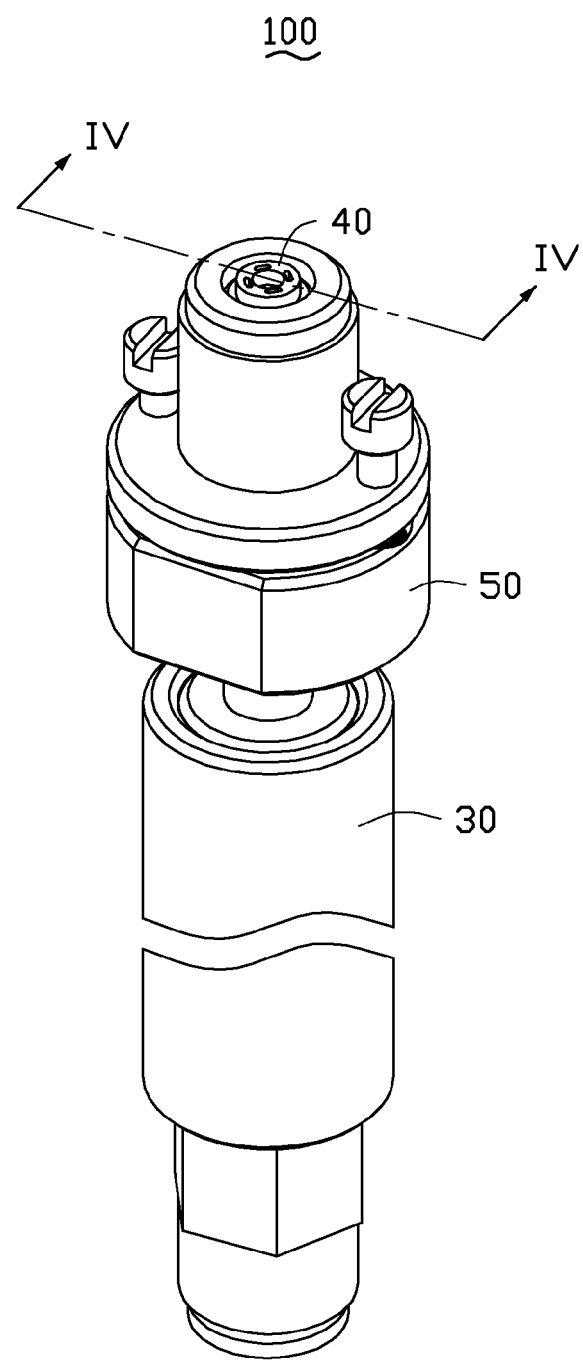
FIG. 1 is an isometric view of an embodiment of a pick up mechanism.
Figure 2:
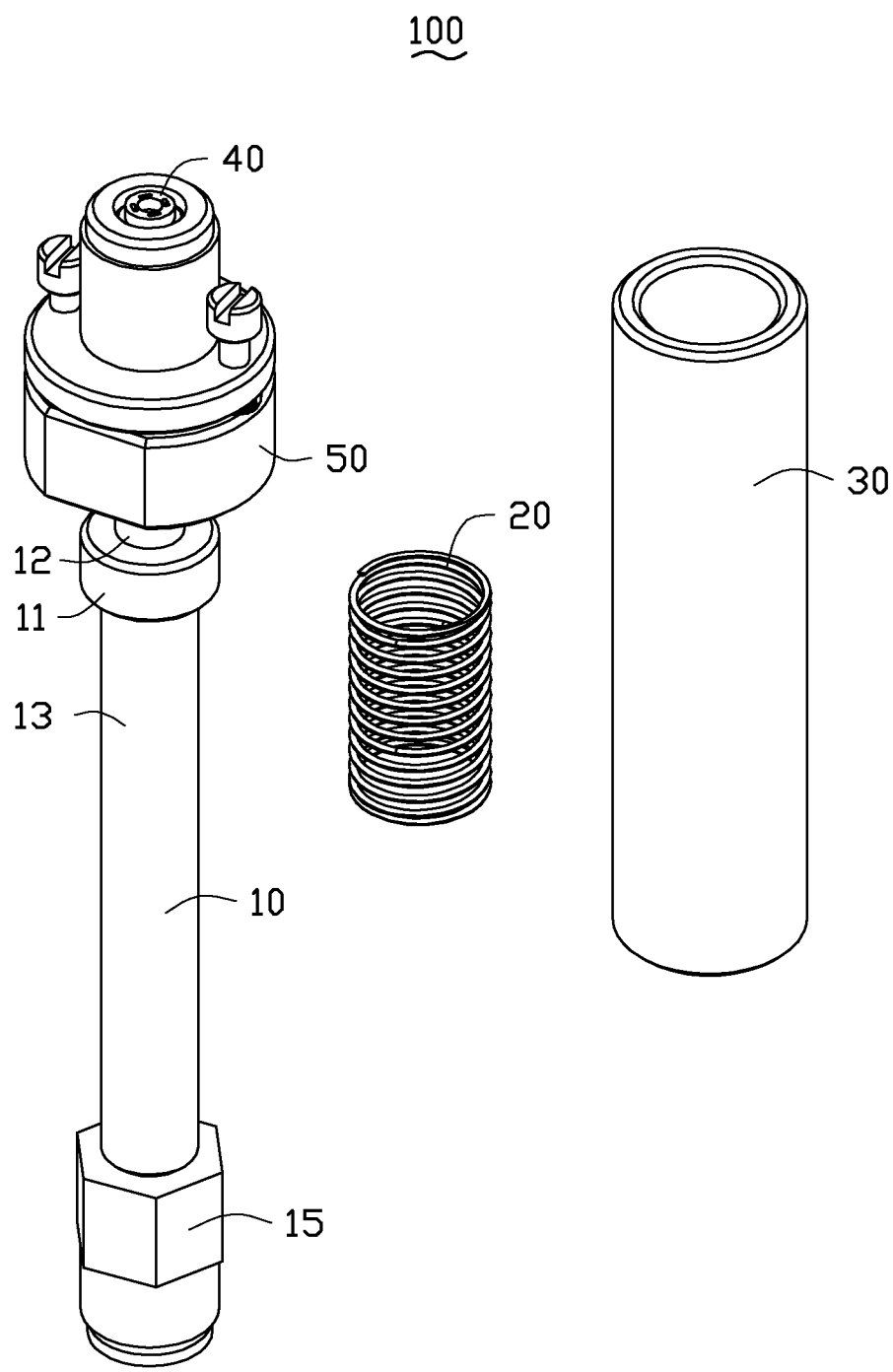
FIG. 2 is a partially exploded, isometric view of the pick up mechanism of FIG. 1.

FIGS. 1 and 2 show an embodiment of a pick up mechanism 100. The pick up mechanism 100 includes a pick up rod 10, a buffering member 20, a sleeve 30, a pick up head 40, and a resisting assembly 50. The sleeve 30 is sleeved on the pick up rod 10, the buffering member 20 is sleeved on the pick up rod 10, and opposite ends of the buffering member 20 is resisted between the pick up rod 10 and the sleeve 30. The pick up head 40 is assembled to an end of the pick up rod 10, the resisting assembly 50 is sleeved on the pick up head 40 and configured for sliding along the pick up rod 10 to expose the pick up head 40.

The pick up rod 10 is substantially in a cylindrically hollow structure, and includes an annular portion 11, a first shaft portion 12, a second shaft portion 13, and a conduit portion 15. The first shaft portion 12 and the second shaft portion 13 protrudes from opposite ends of the annular portion 11 coaxially. The conduit portion 15 is connected to an end of the second shaft portion 13 away from the annular portion 11. Diameters of the annular portion 11, the second shaft portion 13, and the first shaft portion 12 decreases in that order. The pick up rod 10 axially defines an air conduit 17 (referring to FIG. 4). The air conduit 17 extends through the annular portion 11, the first shaft portion 12, the second shaft portion 13, and the conduit portion 15.

The buffering member 20 is sleeved on the second shaft portion 13. The sleeve 30 is sleeved on the second shaft portion 13, and forms a stepped portion 31 in an inner side opposite to the annular portion 11. The buffering member 20 is resisted between the annular portion 11 and the stepped portion 31. In the embodiment, the buffering member 20 is an elastic compression spring.

Figure 3:
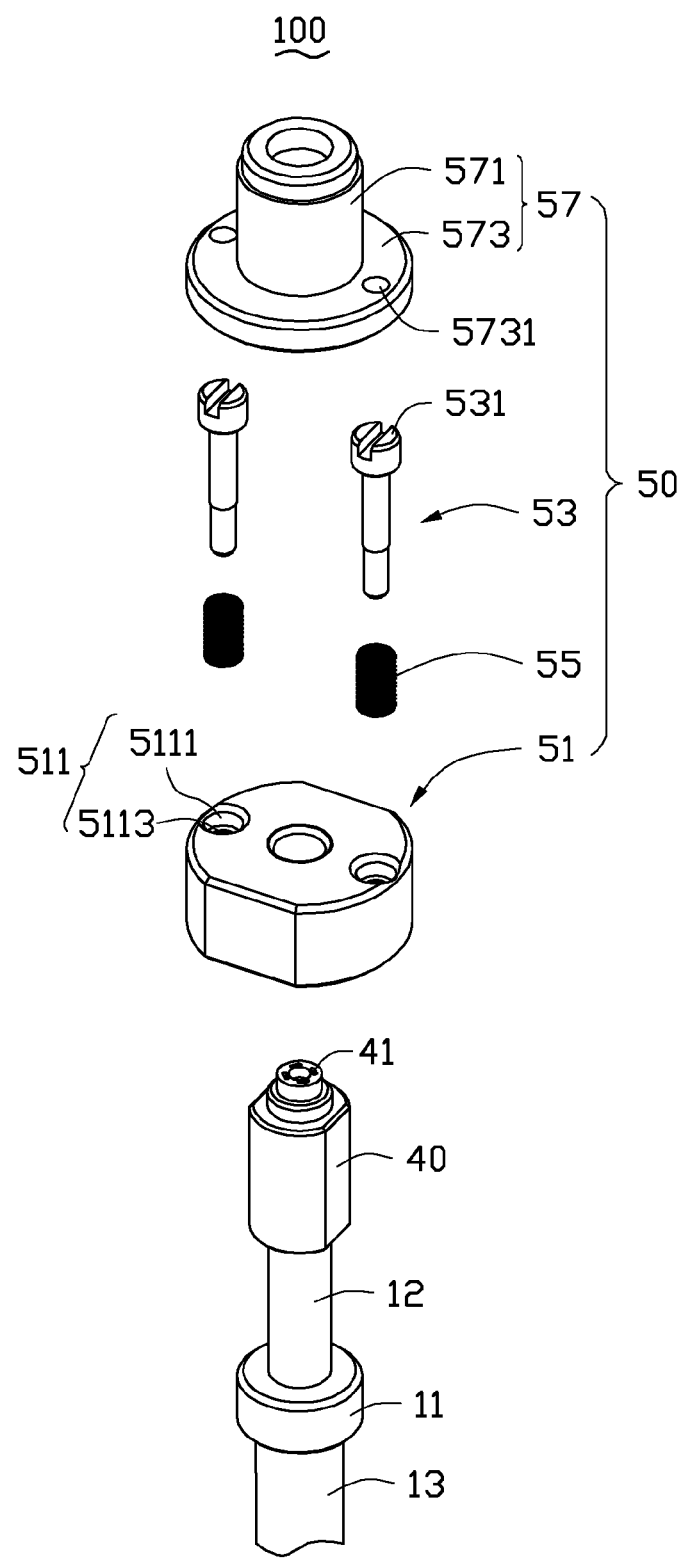
FIG. 3 is an exploded, isometric view of the pick up mechanism of FIG. 1.
Figure 4:
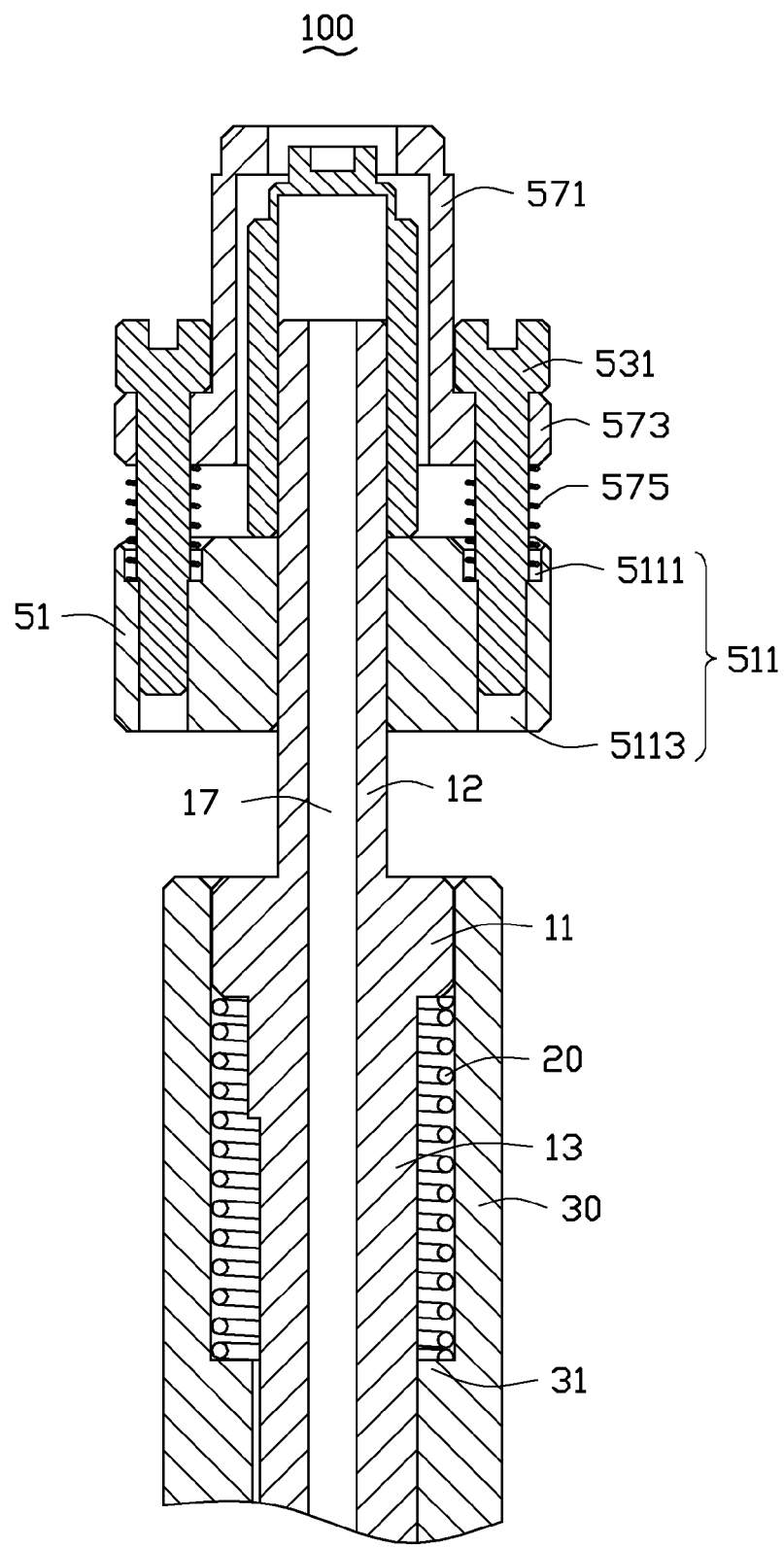
FIG. 4 is a cross-sectional view of the pick up mechanism of FIG. 1, taken along line IV-IV.

FIGS. 3 and 4 show that the pick up head 40 is fixedly sleeved on an end of the first shaft portion 12 away from the annular portion 11. The pick up head 40 has a diameter greater than that of the first shaft portion 12. The pick up head 40 axially defines a plurality of pick up holes 41 at an end surface. The plurality of pick up holes 41 communicates with the air conduit 17 of the pick up rod 10.

The resisting assembly 50 includes a guiding seat 51, a pair of guiding rods 53, a pair of elastic members 55, and a resisting member 57. The guiding seat 51 is annular and fixedly sleeved on the first shaft portion 12, and located between the pick up head 40 and the annular portion 11. The guiding seat 51 axially defines a pair of fixing holes 511. Each fixing hole 511 is cut through opposite ends of the guiding seat 51, and includes a receiving portion 5111 and an extension portion 5113 on a bottom of the receiving portion 5111. The extension portion 5113 has a diameter less than that of the receiving portion 5111. An end of the guiding rod 53 is fixedly received in the extension portion 5113, an opposite end of the guiding rod 53 forms a restricting portion 531. In the embodiment, the guiding rod 53 is a screw rod. The pair of elastic members 55 is sleeved on the pair of the guiding rods 53, and is partially received in the receiving portions 5111 of the pair of fixing holes 511. The resisting member 57 includes a resisting portion 571 and a sleeving portion 573. The resisting portion 571 is substantially in a cylindrical shape and slidably sleeved on the pick up head 40. The sleeving portion 573 extends from a periphery of an end of the resisting portion 571 radially. The sleeving portion 573 defines a pair of extending holes 5731 corresponding to the pair fixing holes 511. The pair of guiding rods 53 are received in the pair of extending holes 5731. The restricting portion 531 blocks an end of the sleeving portion 573 away from the guiding seat 51. The pair of elastic members 55 are sleeved on the pair of guiding rods 53. Opposite ends of the guiding rod 53 respectively resist the guiding seat 51 and the resisting member 57.

FIGS. 1 through 4 show that when in assembly, the buffering member 20 is sleeved on the second shaft portion 13. The sleeve 30 is sleeved on the second shaft portion 13 and compresses the buffering member 20 between the annular portion 11 and the stepped portion 31. The pick up head 40 is fixedly sleeved on the first shaft portion 12, the guiding seat 51 is sleeved on the first shaft portion 12 and located between the pick up head 40 and the annular portion 11. The resisting member 57 is slidably sleeved on the pick up head 40. The pair of guiding rods 53 extend through the pair of extending holes 5731 and fixedly received in the pair of fixing holes 511. The pair of elastic members 55 are sleeved on the pair of guiding rods 53, and resisted between the resisting member 57 and guiding seat 51.

When picking up a workpiece, the pick up head 40 is aligned to the workpiece, the resisting member 57 resists the workpieces surrounding the workpiece to be picked up. The pick up rod 10 drives the pick up head 40 toward the workpiece to be picked up. The guiding seat 51 is driven by the pick up rod 10 to compress the pair of elastic members 55, thereby driving the pair of guiding rods 53 to move relative to the resisting member 57. When the pick up head 40 contacts the workpiece to be picked up, the pick up rod 10 generates a negative pressure in the air conduit 17, thereby enabling the pick up head 40 to pick up the workpiece. Due to the separate arrangement of the plurality of pick up holes 41, the negative pressure may uniformly pick up the workpiece via the plurality of pick up holes 41.

When the pick up head 40 picks up the workpiece, the resisting member 57 resists against the workpieces surrounding the workpiece to be picked up to prevent inference from the workpieces surrounding the workpiece to be picked up, thereby enhancing a pick up accuracy and a pick up efficiency of the pick up head 40.

When the pick up mechanism 100 has an improved impact resistance, the buffering member 20 and the sleeve 30 may be omitted. The number of the elastic members 55 and the number of the guiding rods 53 may be one, or more than two. The resisting member 57 need not to sleeve the pick up head 40, but shields the pick up head 40.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A pick up mechanism, comprising:
   a pick up rod;
   a pick up head assembled to an end of the pick up rod; and
   a resisting assembly, comprising:
      a guiding seat fixedly sleeved on the pick up rod;
      a resisting member slidably shielding the pick up head;
      at least one guiding rod fixed on the guiding seat, and blocking the resisting member, and
      at least one elastic member sleeving on the at least one guiding rod and resisting between the guiding seat and the resisting member, wherein the pick up head is exposed or shielded by moving the resisting member relative to the pick up rod.

2. The pick up mechanism of claim 1, wherein the resisting member comprises a resisting portion and a sleeving portion extending from a periphery of an end of the resisting portion radially, the sleeving portion is slidably sleeved on the pick up head, the sleeving portion defines at least one extending hole sleeving on the at least one guiding rod.

3. The pick up mechanism of claim 2, wherein the at least one guiding rod comprises a restricting portion at an end thereof, the at least one elastic member sleeved on the at least one guiding rod resists the resisting member toward to the restricting portion.

4. The pick up mechanism of claim 3, wherein the guiding seat axially defines at least one fixing hole traversing through opposite ends of the guiding seat, the at least one fixing hole comprises a receiving portion and an extension portion on a bottom of the receiving portion, the extension portion has a diameter less than a diameter of the receiving portion, the end of the guiding rod opposite to the restricting portion is fixedly received in the extension portion, the at least one elastic member is partially received in the receiving portion.

5. The pick up mechanism of claim 1, wherein the pick up rod comprises an annular portion, a first shaft portion, a second shaft portion, and a conduit portion, the first shaft portion and the second shaft portion coaxially protrude from opposite ends of the annular portion, the conduit portion is connected to an end of the second shaft portion away from the annular portion, the pick up head is sleeve on an end of the first shaft portion.

6. The pick up mechanism of claim 5, wherein the pick up rod axially defines an air conduit extending through the annular portion, the first shaft portion, the second shaft portion, and the conduit portion, the pick up head defines a plurality of pick up holes communicating with the air conduit.

7. The pick up mechanism of claim 6, wherein diameters of the annular portion, the second shaft portion, and the first shaft portion sequentially decrease, the pick up mechanism further comprises a sleeve sleeved on the second shaft portion.

8. The pick up mechanism of claim 7, wherein the sleeve forms a stepped portion at an inner side, the pick up mechanism further comprises a buffering member sleeved on the second shaft portion and received in the sleeve, each end of the buffering member resists each of the stepped portion and the annular portion of the pick up rod.

9. A pick up mechanism, comprising:
   a pick up rod;
   a pick up head assembled to an end of the pick up rod; and
   a resisting assembly, comprising:
      a guiding seat fixedly sleeved on the pick up rod;
      a resisting member slidably sleeved the pick up head;
      a pair of guiding rods fixed on the guiding seat;
      a pair of elastic members contained between the guiding seat and the resisting member, wherein each of the pair of guiding rods comprises a restricting portion, each of the pair of elastic members is configured to slide relative to the pair of guiding rods while resisting the resisting member, and the resisting member is positioned to shield the pick up head by the restricting portion holding the resisting member.

10. The pick up mechanism of claim 9, wherein the resisting member comprises a resisting portion and a sleeving portion extending from a periphery of an end of the resisting portion radially, the sleeving portion is slidably sleeved on the pick up head, the sleeving portion defines a pair of extending holes sleeving on the pair of guiding rods.

11. The pick up mechanism of claim 10, wherein each of the pair of elastic members is sleeved on each of the pair of guiding rods and resists the resisting member toward to the restricting portion.

12. The pick up mechanism of claim 11, wherein the guiding seat axially defines a pair of fixing holes each traversing through opposite ends of the guiding seat, each of the pair of fixing holes comprises a receiving portion and an extension portion on a bottom of the receiving portion, the extension portion has a diameter less than a diameter of the receiving portion, the end of the guiding rod opposite to the restricting portion is fixedly received in the extension portion, each of the pair of elastic members is partially received in the receiving portion.

13. The pick up mechanism of claim 9, wherein the pick up rod comprises an annular portion, a first shaft portion, a second shaft portion, and a conduit portion, the first shaft portion and the second shaft portion coaxially protrude from opposite ends of the annular portion, the conduit portion is connected to an end of the second shaft portion away from the annular portion, the pick up head is sleeve on an end of the first shaft portion.

14. The pick up mechanism of claim 13, wherein the pick up rod axially defines an air conduit extending through the annular portion, the first shaft portion, the second shaft portion, and the conduit portion, the pick up head defines a plurality of pick up holes communicating with the air conduit.

15. The pick up mechanism of claim 14, wherein diameters of the annular portion, the second shaft portion, and the first shaft portion sequentially decrease, the pick up mechanism further comprises a sleeve sleeved on the second shaft portion.

16. The pick up mechanism of claim 15, wherein the sleeve forms a stepped portion at an inner side, the pick up mechanism further comprises a buffering member sleeved on the second shaft portion and received in the sleeve, each ends of the buffering member resists each of the stepped portion and the annular portion of the pick up rod.

* * * * *